United States Patent
Peterson et al.

(10) Patent No.: US 12,467,896 B2
(45) Date of Patent: Nov. 11, 2025

(54) DUAL MODE SCANNING OPTICAL SYSTEM FOR CAPILLARY ELECTROPHORESIS

(71) Applicant: DH TECHNOLOGIES DEVELOPMENT PTE. LTD., Singapore (SG)

(72) Inventors: Brian Peterson, Ontario, CA (US); Yagang Liu, Yorba Linda, CA (US)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 567 days.

(21) Appl. No.: 17/776,969

(22) PCT Filed: Nov. 13, 2020

(86) PCT No.: PCT/IB2020/060715
§ 371 (c)(1),
(2) Date: May 13, 2022

(87) PCT Pub. No.: WO2021/095006
PCT Pub. Date: May 20, 2021

(65) Prior Publication Data
US 2022/0412917 A1    Dec. 29, 2022

Related U.S. Application Data

(60) Provisional application No. 62/935,609, filed on Nov. 14, 2019.

(51) Int. Cl.
*G01N 27/447*    (2006.01)
(52) U.S. Cl.
CPC . *G01N 27/44721* (2013.01); *G01N 27/44782* (2013.01)

(58) Field of Classification Search
CPC ....... G01N 27/44721; G01N 27/44782; G01N 2030/628; G01N 27/30
See application file for complete search history.

(56) References Cited

U.S. PATENT DOCUMENTS

| 5,484,571 A | * | 1/1996 | Pentoney, Jr. | ............ G01J 1/04 356/417 |
| 5,545,901 A | | 8/1996 | Pentoney, Jr. et al. | |

(Continued)

FOREIGN PATENT DOCUMENTS

| EP | 0539743 A1 | 5/1993 |
| JP | H06138037 A | 5/1994 |

(Continued)

OTHER PUBLICATIONS

Caslavska J et al: "Modification of a tunable UV-visible capillary electrophoresis detector for simultaneous absorbance and fluorescence detection: profiling of body fluids for drugs and endogenous compounds", Journal of Chromatography A, Elsevier, Amsterdam, NL, vol. 709, No. 1, Aug. 11, 1995 (Aug. 11, 1995), pp. 147-156.

(Continued)

*Primary Examiner* — Alexander S Noguerola
(74) *Attorney, Agent, or Firm* — Potomac Law Group, PLLC; Reza Mollaaghababa; Brian Hairston

(57) ABSTRACT

A dual-mode capillary electrophoresis system (100) is disclosed, which comprises a plurality of capillaries for receiving a plurality of samples, a UV radiation source (120) for generating UV radiation along a first path (PB), a laser light source (110) for generating laser radiation along a second path (PA), and a galvanometric mirror (116) configured to receive radiation from said UV radiation source along said first path and to receive light from said laser light source along said second path, and to direct said received UV radiation and said laser light onto a common optical path, said galvanometric minor further being configured to scan (Continued)

said UV radiation and said laser light sequentially over said plurality of capillaries. The system can further include a detector (190) for detecting the UV radiation as well as a detector (180) for detecting fluorescent radiation via optical fibers (185) emitted by the samples in response to laser excitation.

19 Claims, 12 Drawing Sheets

(56) References Cited

U.S. PATENT DOCUMENTS

| | | | |
|---|---|---|---|
| 6,828,567 | B2 | 12/2004 | Amirkhanian et al. |
| 6,870,165 | B2 | 3/2005 | Amirkhanian et al. |
| 10,794,860 | B2 | 10/2020 | Roach et al. |
| 2002/0197735 | A1 | 12/2002 | Amirkhanian |
| 2004/0144652 | A1* | 7/2004 | Kasai ................. B01L 7/00 |
| | | | 204/603 |
| 2006/0049147 | A1 | 3/2006 | Hayashikawa et al. |
| 2008/0203319 | A1 | 8/2008 | Pentoney et al. |
| 2012/0031762 | A1* | 2/2012 | Gomi ................. B01D 57/02 |
| | | | 204/603 |
| 2018/0321189 | A1 | 11/2018 | Roach et al. |

FOREIGN PATENT DOCUMENTS

| | | |
|---|---|---|
| JP | 2004521334 A | 7/2004 |
| JP | 2005181058 A | 7/2005 |
| JP | 2005209832 A | 8/2005 |
| JP | 2006349666 A | 12/2006 |
| JP | 2007209251 A | 8/2007 |
| JP | 2019504989 A | 2/2019 |
| WO | 02059592 A2 | 8/2002 |
| WO | 2008106627 A2 | 9/2008 |
| WO | 2017123970 A1 | 7/2017 |

OTHER PUBLICATIONS

International Search Report and Written Opinion for International Application No. PCT/IB2020/060715 dated Jan. 13, 2021.
Communication pusuant to Rules 161(1) and 162 EPC for European Application No. 20811746.5 dated Jun. 22, 2022.
International Preliminary Report on Patentability for International Application No. PCT/IB2020/060715 dated May 17, 2022.
Office Action for Japanese Patent Application No. 2022-527985 issued on Nov. 27, 2024 (includes English language translation).

* cited by examiner

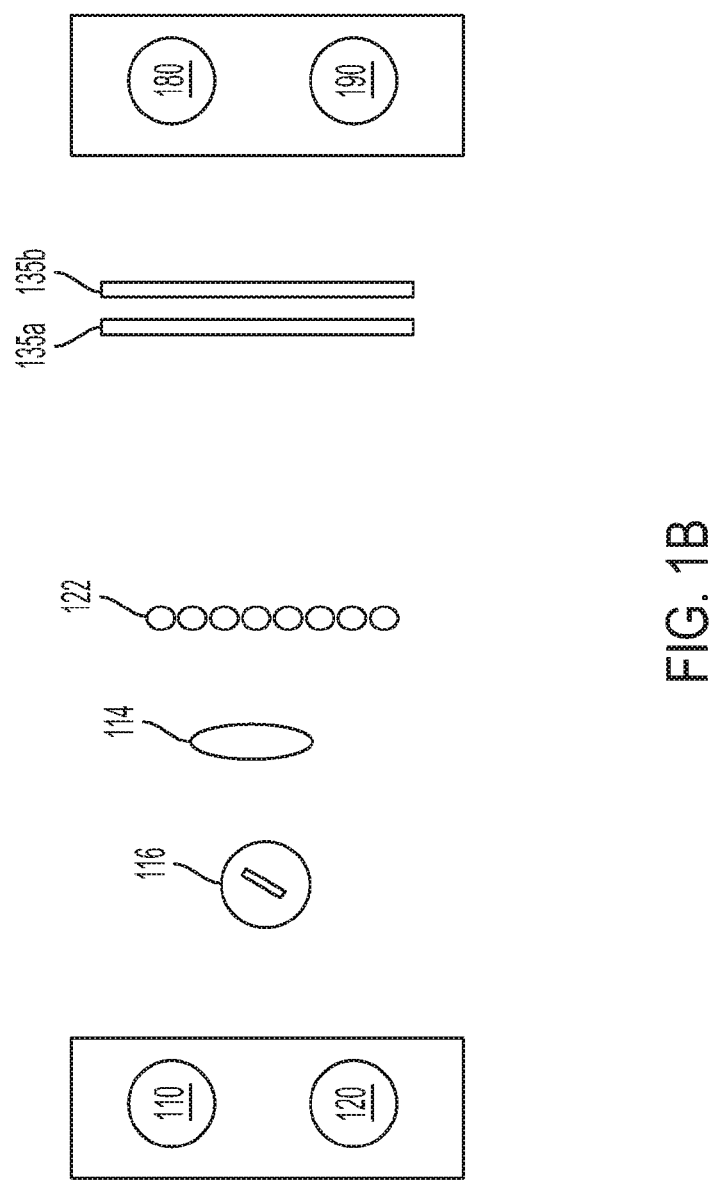

DUAL MODE SCANNING OPTICAL SYSTEM FOR CAPILLARY ELECTROPHORESIS

RELATED US APPLICATIONS

This application claims the benefit of priority from U.S. Provisional Application Ser. No. 62/935,609, filed on Nov. 14, 2019, the entire contents of which is incorporated by reference herein.

FIELD

The present disclosure generally relates to dual mode capillary electrophoresis systems and more particularly to capillary electrophoresis systems that can operate with ease in at least two detection modes, e.g., a UV absorption mode and a laser-induced fluorescent (LIF) mode.

BACKGROUND

Capillary electrophoresis is often employed for rapid separation and analysis of charged species, such as synthetic polynucleotides, DNA sequencing fragments, DNA restriction fragments, amino acids, optical isomers of dansyl amino acids, and the separation of proteins, viruses and bacteria. Micellar electrokinetic capillary chromatography, isoelectric focusing, and on-column derivatization can all be performed on CE columns.

Current instruments can typically analyze only one sample at a time, which limits the instrument's throughput. Further, the change in the detection mode of current instruments is difficult, and typically requires hardware modification and re-validation of the instrument.

SUMMARY

In one aspect, a dual-mode capillary electrophoresis system is disclosed, which comprises a plurality of capillaries for receiving a plurality of samples, a UV radiation source for generating UV radiation along a first path, a laser light source for generating laser radiation along a second path, and a galvanometric mirror configured to receive radiation from said UV radiation source along said first path and to receive light from said laser light source along said second path, and to direct said received UV radiation and said laser light onto a common optical path, said galvanometric mirror further being configured to scan said UV radiation and said laser light sequentially over said plurality of capillaries. The system can further include a first detector positioned relative to the capillaries so as to receive at least a portion of the UV radiation passing through each of said capillaries as that capillary is irradiated with said UV radiation. At least one bundle of optical fibers is positioned relative to said capillaries to receive at least a portion of fluorescent radiation emitted by a sample disposed in each of said capillaries in response to excitation of the sample in that capillary by the laser light. A second detector is optically coupled to the optical fibers for receiving at least a portion of the fluorescent radiation emitted by the capillaries.

A lens can be disposed between the galvanometric mirror and the plurality of capillaries for focusing the UV radiation and the laser light onto the capillaries as the UV radiation and the laser light are scanned across the capillaries. In some such embodiments, the lens is configured to focus the UV radiation and the laser light substantially onto a center of each of the capillaries.

In some embodiments, the laser radiation can excite fluorescent label(s) attached to samples disposed in the capillaries. In some embodiments, ultraviolet (UV) radiation can be employed to excite native fluorescence of biologic samples. The optical fibers can collect the fluorescent radiation. In some embodiments, two bundles of optical fibers are employed to collect the laser-induced fluorescent or UV-induced fluorescent radiation. In some such embodiments, one bundle of the optical fibers is positioned above the lens and is angled downward towards the plurality of capillaries so as to receive at least a portion of the laser-induced or UV-induced fluorescent radiation and another bundle of the optical fibers is positioned below the lens and is angled upward toward the plurality of capillaries so as to receive at least a portion of the laser-induced or UV-induced fluorescent radiation.

In some embodiments, the proximal ends of the optical fibers can be coupled to a plate to fix them relative to the capillaries. In some such embodiments, the distal ends of the optical fibers can be coupled to a coupling element that can align those distal ends relative to the second detector such that the light exiting the optical fibers can be detected by that detector. In some embodiments, the detector can concurrently measure light having multiple wavelengths or can be a detector that offers spectral separation to measure multiple wavelengths separately.

In some embodiments, the system can further include a controller for controlling the galvanometric mirror. The controller can be implemented in hardware, software and/or firmware. By way of example, the controller can include a processor, and one or more memory modules in communication with the processor via at least one communication bus. In some embodiments, the instructions for operating the galvanometric mirror can be stored in a permanent memory module and can be transferred by the processor to the random access memory module during runtime to be executed for operating the galvanometric mirror. By way of example, the controller can cause the galvanometric mirror to illuminate sequentially the plurality of capillaries. In some such embodiments, the controller can be in communication with the UV radiation source as well as the laser light source to activate the UV radiation source and the laser light source in different time intervals for transmitting UV radiation or laser light to the galvanometric mirror in these time intervals. In each time interval, the mirror can scan the UV radiation or the laser light sequentially across the plurality of capillaries.

In some embodiments, the plurality of capillaries are housed within a cartridge. A mount can be provided to which the cartridge can be mounted so as to place the capillaries in the path of the UV radiation and the laser light.

In some embodiments, the UV radiation source can include a UV lamp for generating the UV radiation and a plurality of filters that can be selectively deployed for selecting different wavelengths of the UV radiation emitted by the UV lamp. In some such embodiments, the UV lamp can generate UV radiation with wavelengths in a range of about 185 nm to about 400 nm.

Further, in some embodiments, one or more filters can be disposed in front of the detector configured to detect the fluorescent radiation, e.g., to block the excitation light, thereby increasing the signal-to-noise level. In some embodiment, the light source can generate light having wavelengths in a range of about 372 nm to about 980 nm.

A variety of detectors can be employed to detect the UV radiation and the laser-induced fluorescent radiation. Some examples of suitable detectors include, without limitation, a photodiode and a photomultiplier, a photomultiplier and a photodiode array spectrometer.

In some embodiments, the plurality of capillaries are disposed within a removable cartridge that is slidably insertable into the system and wherein when the removable cartridge is in an inserted state of the system, the plurality of capillaries are aligned to receive said UV radiation and/or said laser light from the galvanometric mirror.

In another aspect, a cartridge for use with a dual-mode capillary electrophoresis system is described, the cartridge comprising a plurality of capillaries that are adapted to receive a plurality of samples and the cartridge is adapted to be insertable into the dual-mode capillary electrophoresis system between an inserted state and a removed state. The dual-mode capillary electrophoresis system can comprise: a UV radiation source for generating UV radiation along a first path, a laser light source for generating laser radiation along a second path, a galvanometric mirror configured to receive radiation from said UV radiation source along said first path and to receive light from said laser light source along said second path, and to direct said received UV radiation and said laser light onto a common optical path, said galvanometric mirror further being configured to scan said UV radiation and said laser light sequentially over said plurality of capillaries when the cartridge is in the inserted state, a first detector positioned relative to said capillaries when the cartridge is in the inserted state so as to receive at least a portion of the UV radiation passing through each of said capillaries as that capillary is irradiated with said UV radiation, at least one bundle of optical fibers positioned relative to said capillaries when the cartridge is in the inserted state to receive at least a portion of fluorescent radiation emitted by a sample disposed in each of said capillaries in response to excitation of the sample in that capillary by said laser light or UV radiation, a second detector optically coupled to said optical fibers for receiving at least a portion of the fluorescent radiation captured by said capillaries when said cartridge is in the inserted state.

BRIEF DESCRIPTION OF THE DRAWINGS

FIG. 1B schematically depicts certain components of the system shown in FIG. 1A.

DETAILED DESCRIPTION

Figure 1A:
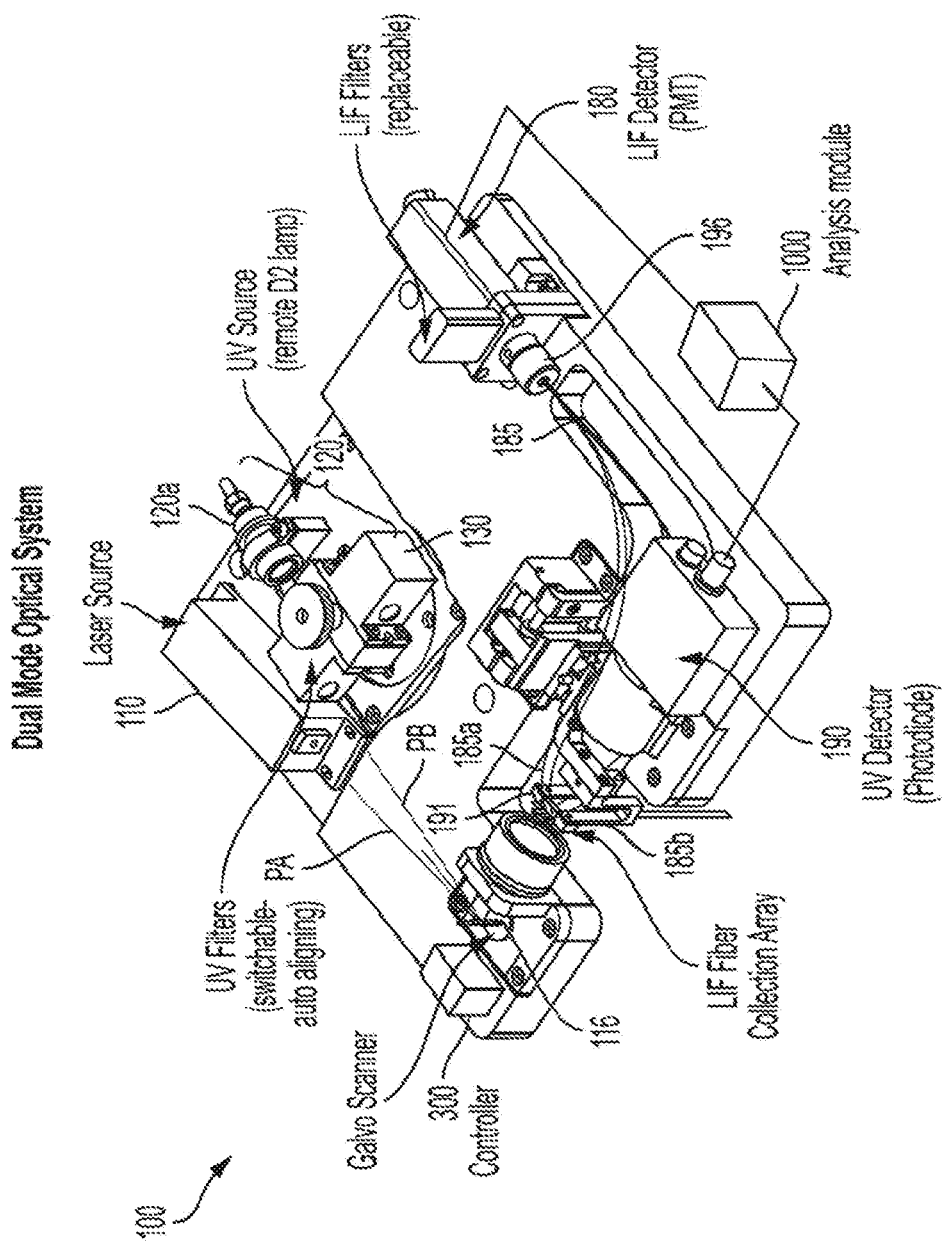
FIG. 1A schematically depicts a dual-mode capillary electrophoresis system according to an embodiment.
Figure 1C:
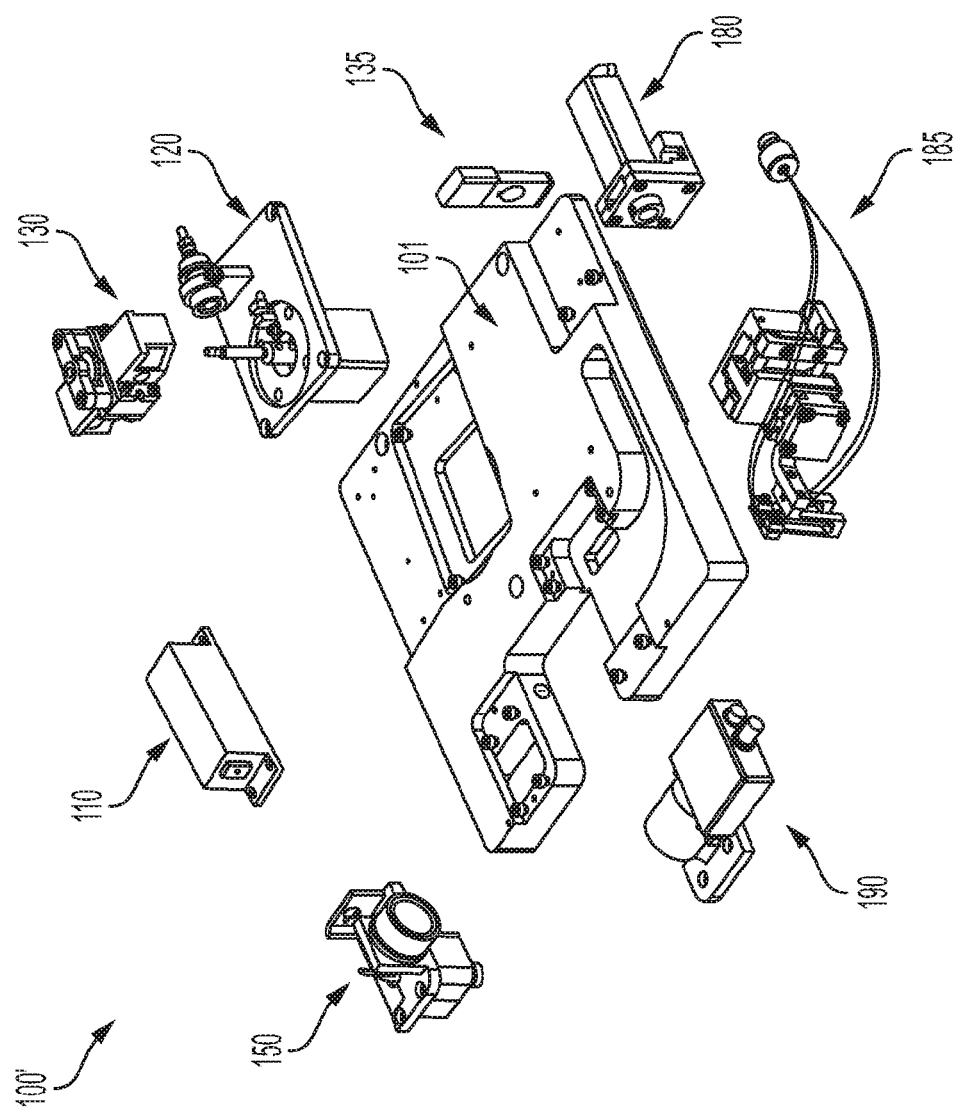
FIG. 1C schematically depicts certain components of the system shown in FIG. 1A.
Figure 1D:
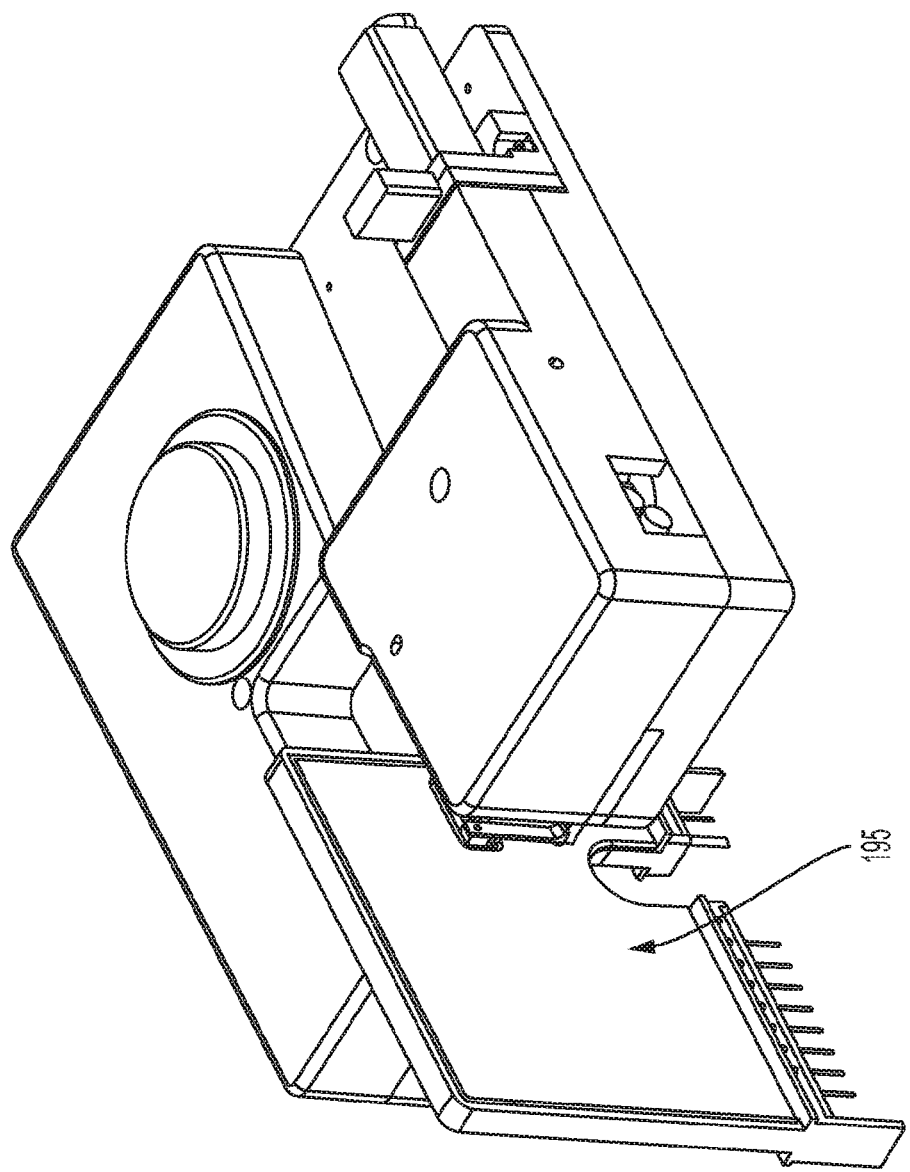
FIG. 1D schematically depicts a cartridge according to an embodiment, which contains a plurality of capillaries and a mount for receiving the cartridge.

The present teachings provide a dual-mode capillary electrophoresis system that facilitates the analysis of multiple samples. In some embodiments, the system employs a galvanometric scanning mirror that can direct radiation from a laser or a UV source, e.g., via a single lens, sequentially across an array of capillaries. In some embodiments, the array of capillaries can be implemented in a silicon chip with windows at each capillary position where the capillaries are bonded to the chip. The windows control the passage of the light through the capillaries and are configured so as to yield an optimal performance of the system. As discussed in more detail below, in some such embodiments, a photodiode is positioned, e.g., along the optical axis, to collect at least a portion of the UV radiation passing through the capillaries for performing absorbance measurements. The photodiode can also serve to initially align the beam positions with the center of each capillary window by sweeping the UV radiation or the laser light across the array of capillaries and recording the center positions.

During data acquisition, the galvanometric scanning mirror can step scan the UV radiation or the laser light to each capillary and maintain the radiation on each capillary for a preselected dwell time for data collection. In some embodiments, the laser light is employed to excite fluorescent labels attached to samples under investigation or UV radiation is employed to excite native fluorescence (e.g., native fluorescence of a biologic sample). In response to such excitation, the fluorescent labels or a biologic sample exhibiting native fluorescence can emit fluorescent radiation, which can be detected as discussed below. By way of example, in some embodiments, for such laser-induced fluorescence detection, an array of optical fibers (e.g., 24 optical fibers) are placed at a 45-degree angle above and below the optical axis of the radiation (e.g., 12 above and 12 below) with the intersection of putative extensions from the tip of the fibers to the capillaries located at the center of the capillaries where the radiation enters the capillaries. The fibers can collect the fluorescent radiation from the entire capillary array and direct the fluorescent radiation to a photomultiplier tube after passage through a laser-light or UV rejection filter and a bandpass filter for blocking the excitation light from reaching the photomultiplier tube and selecting a desired radiation bandwidth for detection. Alternatively, the radiation can be separated by wavelength through an optical grating onto an array of photodiodes. One advantage of a system according to the present teachings is that it eliminates the need for hardware replacement in order to switch from UV radiation to laser light for interrogating samples under study. Rather, in a system according to the present teachings, switching from one detection mode to another only involves moving the galvanometric mirror from one radiation source to another. In some embodiments, a user can simply select, e.g., via a graphical user interface, the detection mode of interest.

With reference to FIGS. 1A, 1B, 1C, 1D, 1E, and 1G, a dual-mode capillary electrophoresis system 100 according to an embodiment includes an array of capillaries 122 that are arranged in a cartridge 195 and each of which is configured to receive a sample under study. The multi-capillary array 122 includes a silicon chip with windows at each capillary position where the capillaries are bonded. The cartridge is insertable (slidably or otherwise) into the system as described herein and is mounted to the system when in an inserted state. When the cartridge is in an inserted state, the capillaries 122 contained with the cartridge 195 are aligned to receive UV light and/or laser light from the Galvo scanner and are also aligned with the optical fibers and/or the photodiodes that are part of the detection system.

Figure 3A:
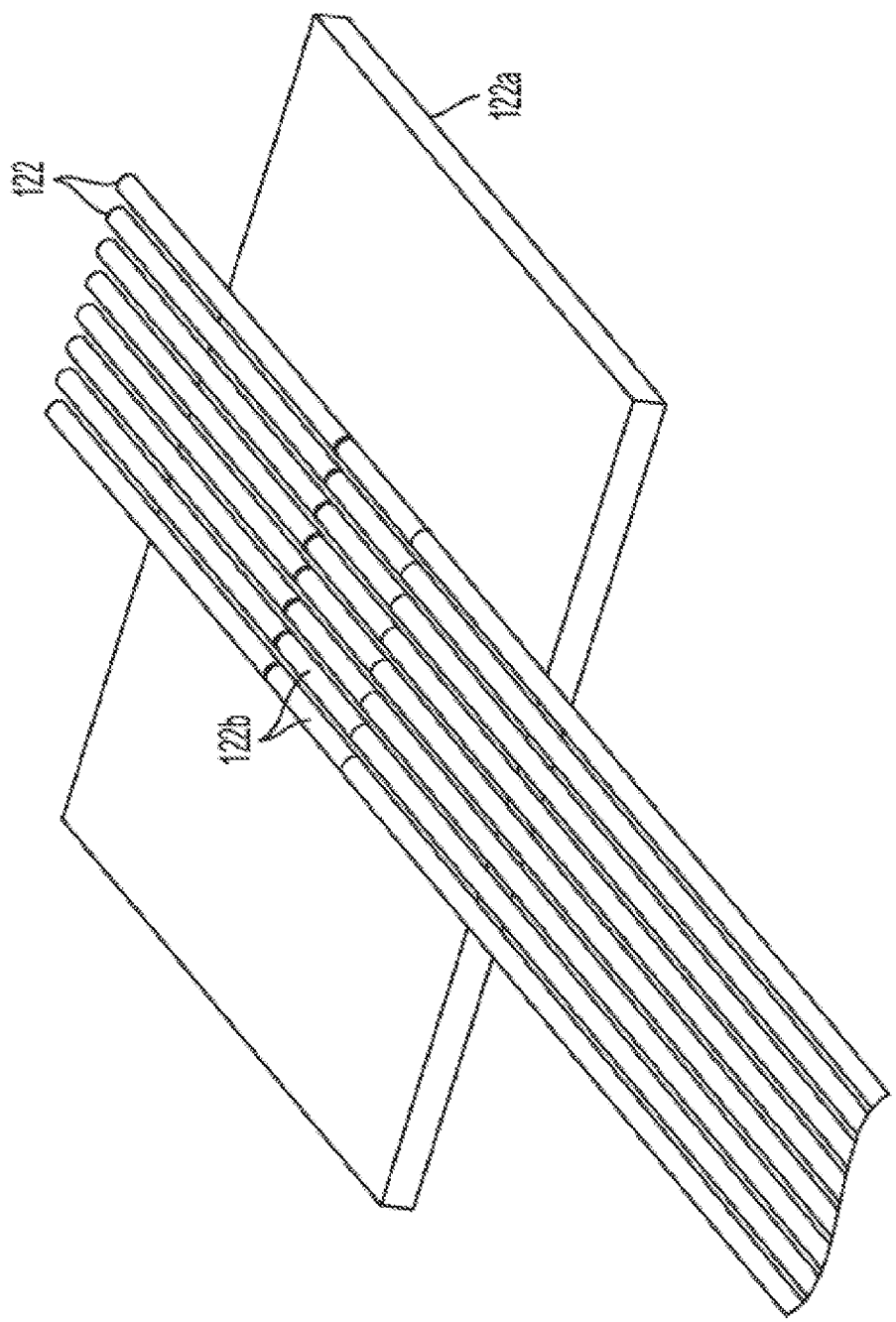
FIGS. 3A and 3B schematically show capillaries employed in on embodiment of the present teachings, where the capillaries are bonded to a chip.
Figure 3B:
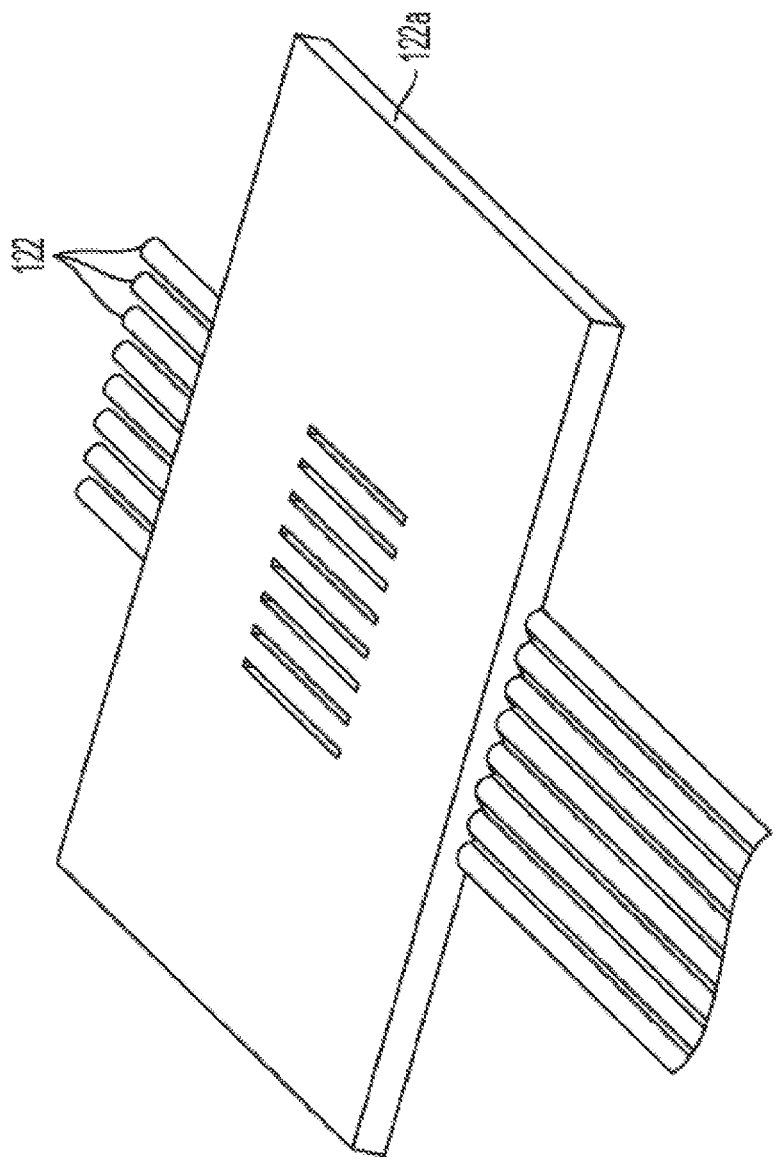

By way of example, FIGS. 3A and 3B schematically depict the array of capillaries 122 bonded to a chip 122a and having windows 122b through which laser light and/or UV radiation can be received or emitted. The windows control the passage of radiation through the capillaries so as to yield an optimal performance of the system. As discussed in more detail below, the capillaries are positioned in the path of radiation generated by the multiple radiation sources.

In this embodiment, the system 100 includes an ultraviolet (UV) radiation source 131 (See, FIG. 1E) and associated UV filters 130 and a laser source 110. The UV radiation source can be, for example, a UV lamp, which can generate UV radiation, e.g., radiation with wavelengths in a range of about 185 nm to about 400 nm, for performing absorbance measurements of samples disposed in the capillaries 122 and the laser source 110 can be any suitable laser, which generates laser radiation for eliciting fluorescent radiation from one or more samples disposed in the capillaries, e.g., by exciting fluorescent labels attached to one or more samples disposed in the capillaries 122. By way of example, the laser source 110 can generate radiation with one or more wavelengths in a range of about 372 nm to about 980 nm, for performing laser-induced fluorescence study of those samples. By way of example, as noted above, in some embodiments, the samples disposed in the capillaries can be labeled with one or more fluorescent tags, which can be excited by the laser radiation and emit fluorescent radiation in response to such excitation. In some embodiments, the UV radiation can be employed to excite native fluorescence of biologic samples.

In this embodiment, the UV radiation source 120 includes a broad-spectrum UV lamp 120a. The UV source uses a single optical fiber (See, fitting 202 in FIG. 1E) that extends to a fiber collimator (See, fiber collimator 120b in FIG. 1). A plurality of switchable UV filters 130 are provided, which can be selected one at a time for filtering the radiation generated by the UV radiation source 120. A stepping motor can be used to switch the UV filter that is disposed along the path of radiation generated by the UV radiation source 120 and a knob 130a is used to remove the UV filters. In this manner, a wavelength of interest can be selected from wavelengths generated by the broad-spectrum UV lamp. In addition, the UV source is tuneable by use of the stepper motor to maximize the light power depending on the wavelength chosen and the filter(s) utilized.

Figure 1E:
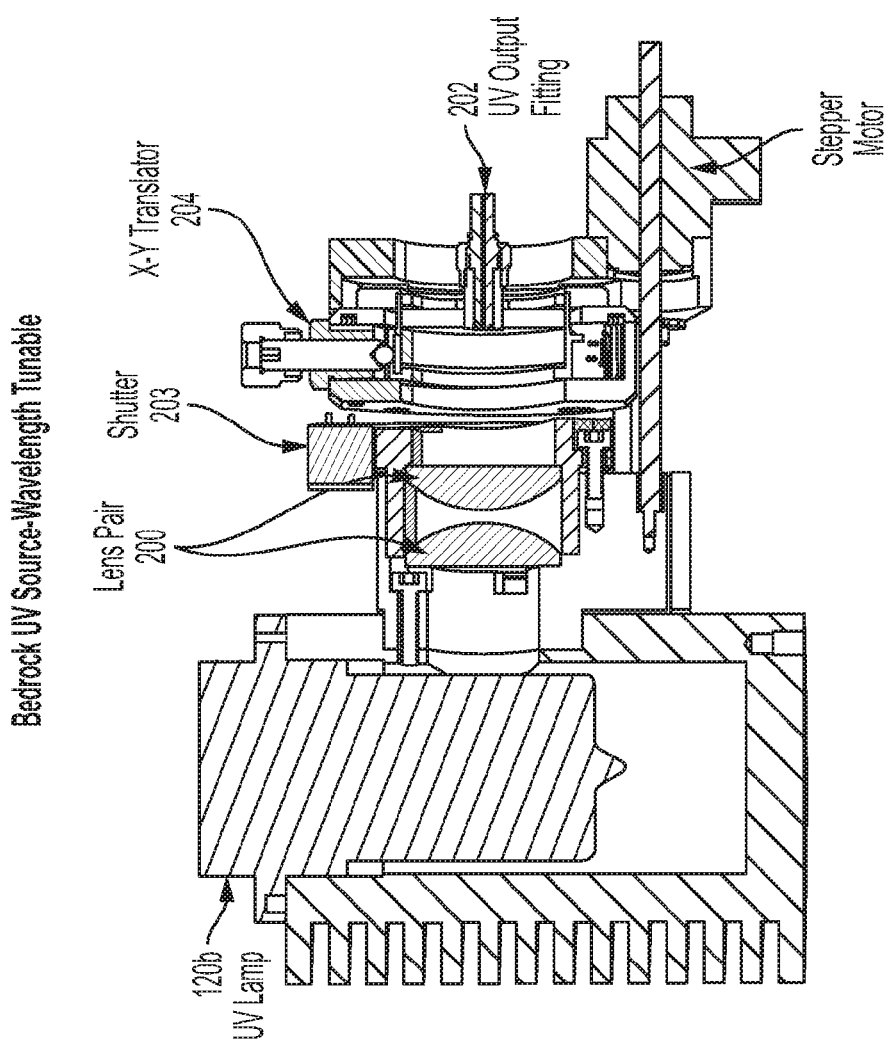
FIG. 1E schematically depicts a UV radiation source suitable for use in the practice of some embodiments of the present teachings.

As shown in FIG. 1E, a lens pair 200 can focus the UV radiation generated by the lamp toward the UV output fitting 202. A shutter 203 can allow blocking the UV radiation generated by the lamp from exiting the source. An X-Y translator 204 can be moved via a stepper motor to allow adjusting the position of the UV output fitting relative to the lens pair 200.

Figure 1F:
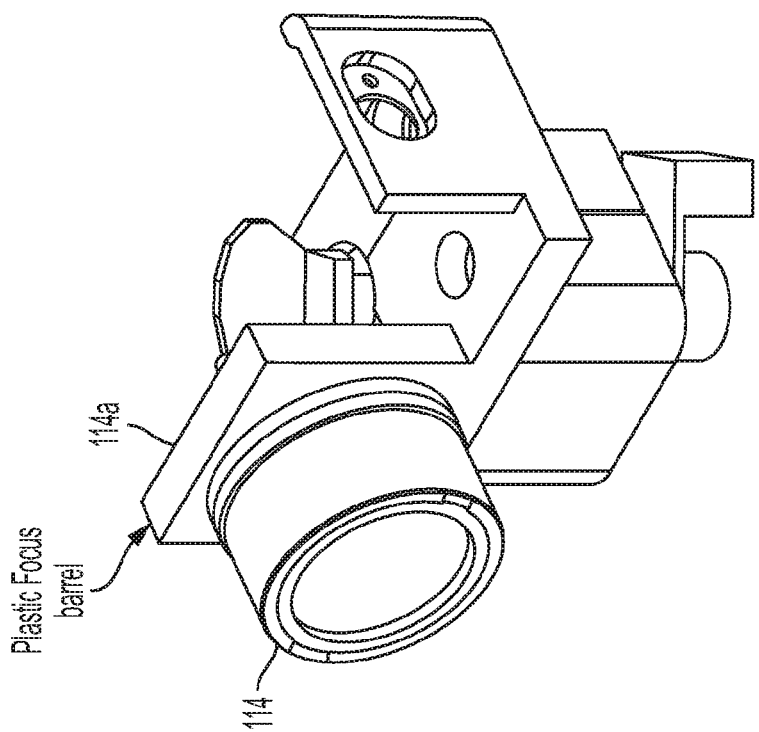
FIG. 1F schematically depicts a lens employed in the system shown in FIG. 1A for focusing any of the UV radiation and the laser light onto a plurality of sample-holding capillaries.

The dual-mode capillary electrophoresis system 100 further includes suitable optics for directing the radiation emitted by the laser source 110 and the UV radiation source 120 onto the array of capillaries 122. Such optical elements can include, without limitation, one or more mirrors, lenses (e.g., focusing lenses), among others. In this embodiment, a galvanometric scanning mirror 116 can receive radiation emitted by the UV radiation source 120 and the laser 110 along different paths (PA) and (PB), respectively, and direct the UV radiation and the laser light onto a common optical path directed to a focusing or scan lens 114. As shown in FIG. 1F, the focusing lens 114 can be held in place via coupling to a holder 114a.

While in this embodiment the galvanometric mirror 116 receives the UV radiation and the laser light directly from the UV and the laser source, respectively; in other embodiments, one or more optical elements, e.g., a lens, can be positioned between any of the UV radiation source or the laser source and the galvanometric mirror.

The focusing or scan lens 114 can in turn focus the UV radiation and the laser light onto one of the capillaries of the capillary array 122. For example, in some embodiments, the lens 114 is configured to focus the UV radiation and the laser light at the center of a selected capillary. The galvanometric mirror 116 can be scanned to sequentially illuminate the samples contained in the capillaries of the capillary array with the UV radiation and the laser light.

The system 100 can further include a plurality of detectors for detecting at least a portion of the UV radiation that is transmitted through the capillaries and the fluorescent radiation that is emitted by fluorescent label(s) attached to sample(s) disposed within the capillaries in response to excitation by the laser light or excitation of native fluorescence of one or more biomolecules of a biologic sample by UV radiation. The detectors can generate detection signals in response to the detection of the UV radiation and/or the fluorescent radiation, where the detection signal can be analyzed to obtain information regarding the samples disposed within the capillaries.

More specifically, in this embodiment, a UV detector 190 (e.g., a photodiode detector) is positioned relative to the capillaries so as to receive at least a portion of the UV radiation that is transmitted through the samples disposed in the capillaries. In this embodiment, the photodiode detector 190 is positioned substantially along the common optical path along which the galvanometric mirror 116 directs the UV radiation and the laser light.

In some embodiments, the photodiode detector 190 also serves to initially align the beam positions to the center of each window. For example, the UV radiation can be swept across the array of capillaries and the center positions of the capillaries can be recorded. There is a window in front of each capillary. When the light passes through the windows associated with the capillaries during the sweep of the UV radiation, a signal is detected showing eight peaks. The midway point between the start and end of each peak corresponds to the center of the capillary window and thus the capillary.

In this embodiment, the system 100 further includes a fluorescence detector 180 for detecting the laser-induced or UV-induced fluorescence, which is a photomultiplier tube (PMT) in this implementation, for detecting the fluorescent radiation emitted by the samples (e.g., the fluorescent radiation emitted by fluorescent markers attached to the samples or native fluorescent radiation of a biologic sample excited by the UV radiation). As discussed in more detail below, in this embodiment, the fluorescence detector receives the emitted fluorescent radiation via a plurality of optical fibers 185.

More specifically, an array of optical fibers 185*a* is positioned above the plane of the optical axis of the radiation (i.e., the common optical path) and the fibers are angled downward at about 45 degrees so as to receive at least a portion of the fluorescent radiation emitted by the sample(s) disposed in the capillaries. Another array of optical fibers 185*b* is positioned below the plane of the optical axis and the fibers of that array are angled upward at about 45 degrees to receive at least a portion of the fluorescent radiation emitted by the sample(s) disposed in the capillaries. In general, the upper and the lower optical fibers are angled such that their putative extensions would intersect at the core of the capillaries where the radiation passes therethrough.

Figure 1G:
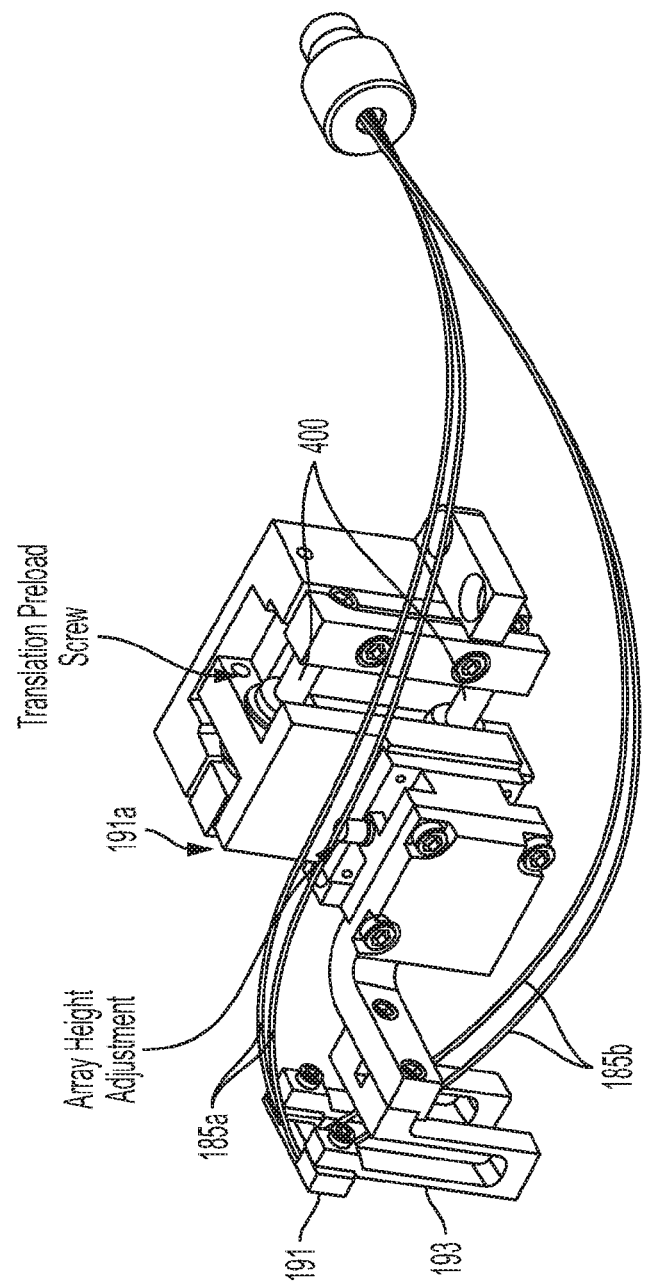
FIG. 1G shows a plurality of optical fibers for directing the laser-induced fluorescent radiation to a detector, a plate supporting the proximal ends of the optical fibers, a mount for receiving a cartridge containing the capillaries, and a translation stage for moving the mount and the plate.

In this embodiment, each of the upper and the lower bundle of optical fibers includes 12 fibers (i.e., a total of 24 optical fibers are employed), though in other embodiments other numbers of optical fibers can be employed. In this embodiment, the proximal ends of the optical fibers 185 are attached to a plate 191 that is in turn attached to a mount 193 onto which the cartridge 195 containing the capillaries can be mounted. As shown in FIG. 1G, the mount 193 can be coupled to a translation stage 193*a*, which allows adjusting the height of the mount so as to align the capillaries with the radiation/light beams. A plurality of guide rods (400) can bring the collection fibers into proximity of the capillaries.

The distal ends of the optical fibers 185 are coupled to a fiber coupling element 196 that aligns the distal ends of the optical fibers with the fluorescene detector for efficient coupling of the fluorescent radiation (e.g., laser-induced or UV-induced fluorescent radiation) into the fluorescence detector.

In use, the galvanometric scanning mirror 116 scans the UV radiation and the laser light across the capillaries by sequentially stepping the UV and the laser beams across the center locations of the capillaries 122. During data acquisition, the beams are centered on a capillary for a selected dwell time as data (e.g., UV absorption data and/or fluorescent data) is collected. The dwell time can vary based on, e.g., the number of capillaries and the type of analysis.

Figure 2:
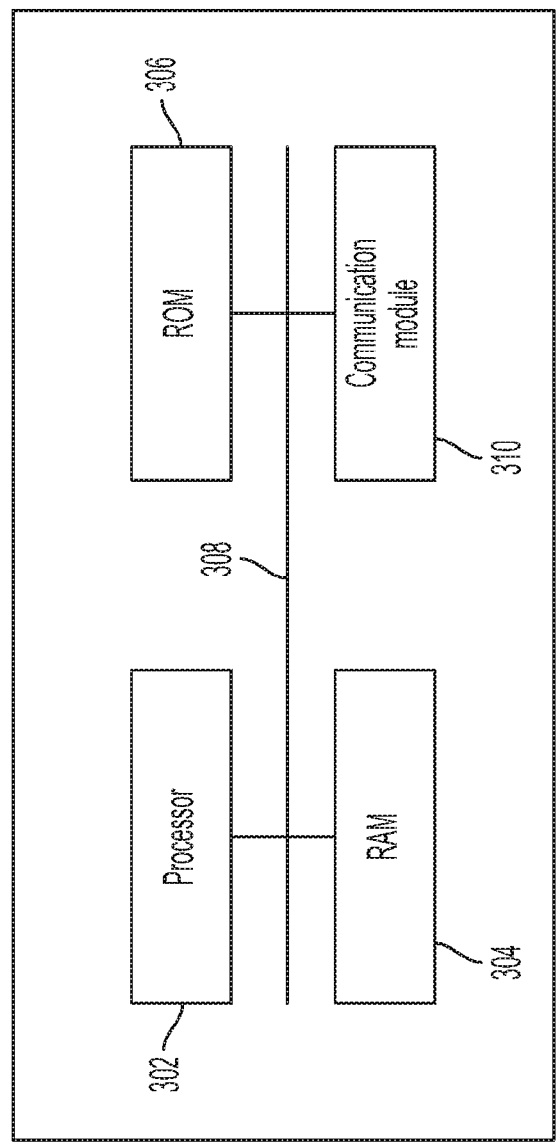
FIG. 2 schematically depicts an example of implementation of a controller for operating the galvanometric mirror.

In some embodiments, a controller 300 can control the scanning of the galvanometric mirror 116 to direct the UV radiation or the laser light beam to the capillaries. The controller 300 can be implemented in hardware, firmware and/or software. By way of example, as shown in FIG. 2, the controller 300 can include a processor 302, a random access memory RAM 304, a permanent memory ROM 306, and a communication bus 308 that allows the processor 302 to communicate with other components of the controller 300. A set of instructions for controlling the galvanometric mirror 116 can be stored in ROM 306 and can be transferred to RAM 304 during runtime to control the scanning of the galvanometric mirror 116

The fluorescent radiation emitted by the sample disposed in a capillary is collected by the fibers 185, which then transmit the collected fluorescent radiation to the fluorescence detector 180. In this embodiment, a cartridge 135 contains a filter 135*a* for rejecting the scattered laser or UV excitation light and a bandpass filter 135*b* for positioning in front of the fluorescence detector 180 to block the scattered laser or UV excitation light from reaching the detector and allowing a desired bandwidth of the fluorescent radiation to reach the detector, thereby enhancing the signal-to-noise ratio of the detected fluorescent radiation.

In some embodiments, the capillaries are illuminated with the UV radiation and the laser light during different time intervals, though in some embodiments, the capillaries can be illuminated sequentially with the UV radiation and the laser light. In some embodiments, at least a portion of the UV radiation can be absorbed by the illuminated sample and a portion of the UV radiation can be transmitted through the sample. The UV radiation transmitted through the sample (or at least a portion thereof) can be detected by the photodiode detector 190. The photodiode detector can generate a detection signal that can be employed to determine the UV absorbance of the illuminated sample.

As shown schematically in FIG. 2, the system 100 can further include an analysis module 1000, which is in communication with the photodiode 190 and the photomultiplier tube 180 to receive the detection signals from these detectors and to operate on the signals to obtain information regarding a sample under interrogation. The analysis module 1000 can be implemented in hardware, firmware and/or software, e.g., in a manner discussed above in connection with the controller 300. In some embodiments, a diode array spectrometer detector can be employed.

A dual-mode capillary electrophoresis system 100 according to the present teachings can provide a number of advantages. For example, in such a system, switching the operational mode from the UV absorption mode to the laser-induced fluorescence (LIF) or native fluorescence (also referred to as fluorescence spectroscopy) mode can be readily achieved by adjusting the galvanometric scanning mirror to receive radiation from the source of interest. In other words, since the system employs common components for the two modes, there is no need to remove and replace various components to switch from one operational mode to another.

EXAMPLES

Example 1

UV absorbance of samples of deionized (DI) water containing different concentrations of caffeine (i.e., 2 μM, 5 μM, 20 μM, 100 μM, 500 μM, 1 mM, 2 mM, and 3 mM) was measured by passing UV radiation at a wavelength of 220 nm through a plurality of capillaries containing the samples. The decrease in the transmitted UV power was converted into UV absorbance.

Figure 4:
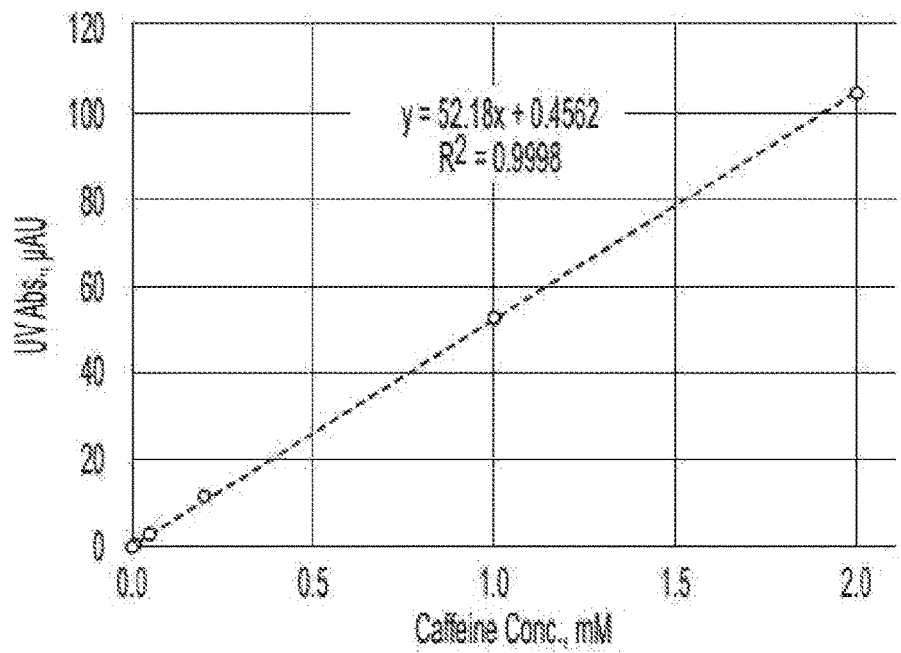
FIG. 4 demonstrates a linear dynamic range in the detection of caffeine concentrations from 2 $\mu$M up to 2 mM.

FIG. 4 demonstrates a linear dynamic range in the detection of caffeine concentrations from 2 μM up to 2 mM with linear correlation of $R^2 \geq 0.9998$.

Figure 5:
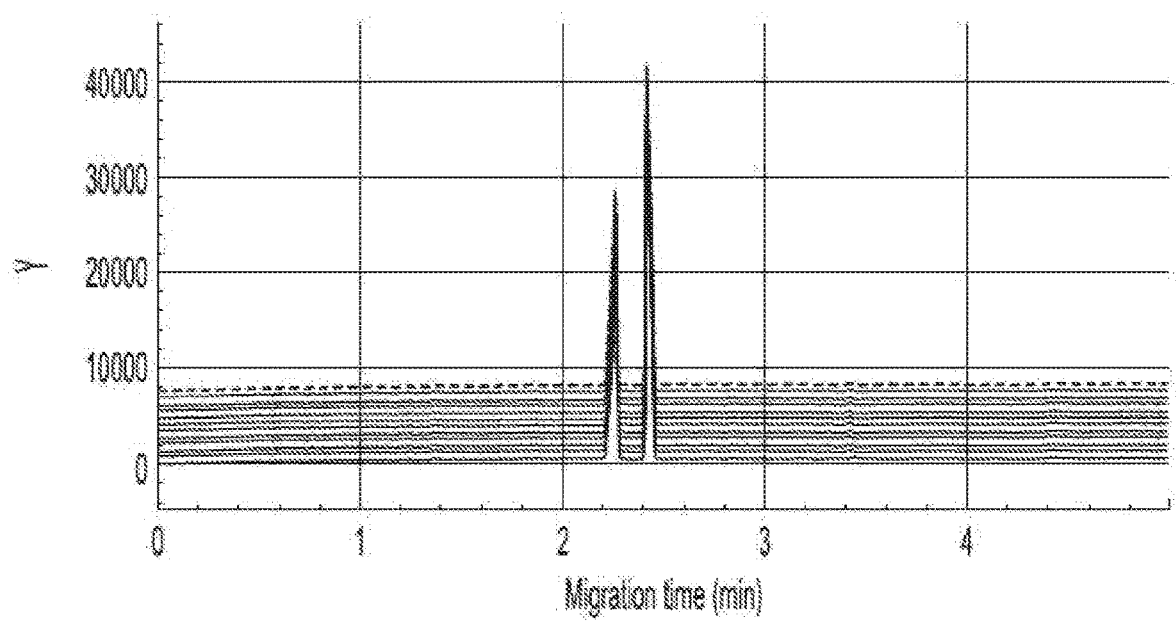
FIG. 5 shows CZE separation with Test Matrix B sample (Sciex) simultaneously run through 8 capillaries.

FIG. 5 shows CZE separation with Test Mix B sample (Sciex) simultaneously run through 8 capillaries. The relative standard deviation of migration time were under 0.5% for Run-to-Run as well as Capillary-to Capillary. The relative standard deviation of peak area were under 2% for Run-to-Run and 5% for Capillary-to Capillary. The UV signal crosstalk from adjacent capillaries was under 0.08%.

Example 2

Figure 6:
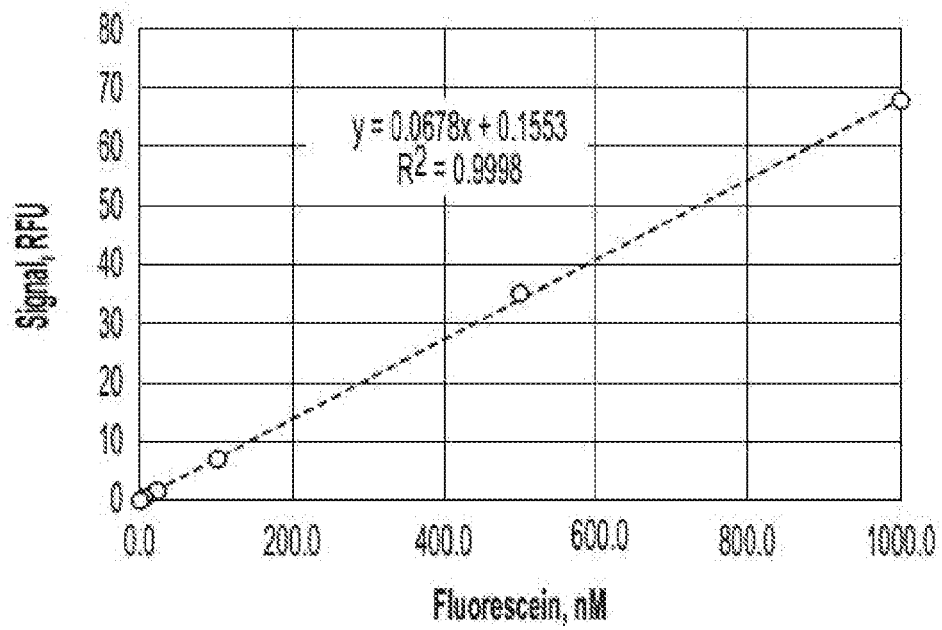
FIG. 6 shows fluorescence intensity using different concentrations of sodium fluorescein.

Laser induced fluorescence (LIF) was measured by collocating fluorescence through a fiber array cable to a photomultiplier tube detector. Excitation wavelength length was 488 nm for sodium fluorescein and LIF Test Mix sample. FIG. 6 shows fluorescence intensity (relative fluorescence unit RFU) using different concentration of sodium fluorescein (i.e., 100 pM, 200 pM, 1 nM, 5 nM, 20 nM, 100 nM, 500 nM, and 1 µM) in 50 µm core capillary array. The dynamic range is at least 10000:1 with $R^2$=0.9998.

Figure 7:
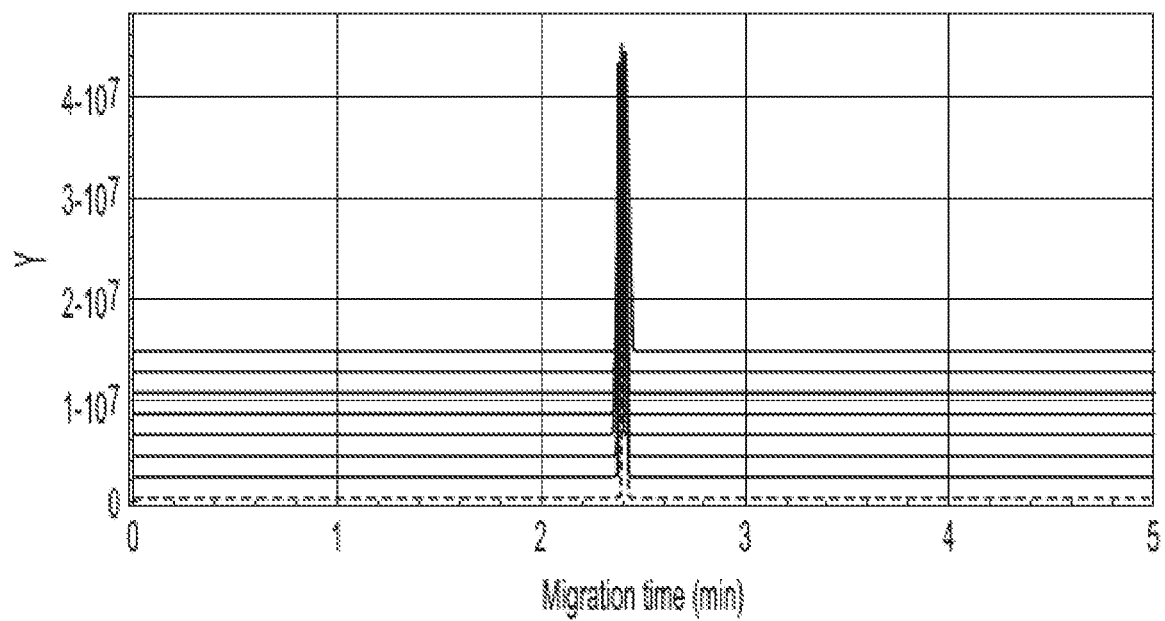
FIG. 7 shows the results of a CZE separation with LIF Test Matrix Sample (Sciex) simultaneously run through 8 capillaries.

FIG. 7 shows the results of a CZE (capillary zone electrophoresis) separation with LIF Test Mix sample (Sciex) simultaneously run through 8 capillaries. The LIF signal crosstalk from adjacent capillaries are under 0.015%.

The invention claimed is:

1. A capillary electrophoresis system, comprising:
a plurality of capillaries for receiving a plurality of samples,
a UV radiation source for generating UV radiation,
a laser light source for generating laser,
a galvanometric mirror configured to receive said UV radiation and to receive said laser light along paths that are different from each other, and to direct said received UV radiation and said received laser light onto a common optical path, said galvanometric mirror further being configured to scan said UV radiation and said laser light sequentially over said plurality of capillaries,
a first detector positioned relative to said capillaries so as to receive at least a portion of the UV radiation passing through each of said capillaries as that capillary is irradiated with said UV radiation,
at least one bundle of optical fibers positioned relative to said capillaries to receive at least a portion of fluorescent radiation emitted by a sample disposed in each of said capillaries in response to excitation of the sample in that capillary by said laser light or UV radiation,
a second detector optically coupled to said optical fibers for receiving at least a portion of the fluorescent radiation received by said at least one bundle of optical fibers.

2. The system of claim 1, further comprising a lens disposed between said galvanometric mirror and said plurality of capillaries for focusing said UV radiation and said laser light onto said capillaries as the UV radiation and the laser light are scanned across said capillaries.

3. The system of claim 2, wherein said lens is configured to focus the UV radiation and the laser light substantially onto a center of each of said capillaries.

4. The system of claim 1, wherein said at least one bundle of optical fibers comprises a first bundle of optical fibers positioned above said lens and angled towards said plurality of capillaries so as to receive at least a portion of said fluorescent radiation.

5. The system of claim 1, wherein said at least one bundle of optical fibers comprises a second bundle of optical fibers positioned below said lens and angled towards said plurality of capillaries so as to receive at least a portion of said fluorescent radiation.

6. The system of claim 1, further comprising a controller for controlling said galvanometric mirror.

7. The system of claim 6, wherein said controller is configured to control said galvanometric mirror so as to scan said UV radiation and said laser light across said capillaries during different time intervals.

8. The system of claim 1, further comprising a cartridge containing said plurality of capillaries.

9. The system of claim 8, further comprising a mount onto which said cartridge can be mounted.

10. The system of claim 9, further comprising a bracket to which proximal ends of said at least one bundle of optical fibers are coupled.

11. The system of claim 10, further comprising a coupling element for receiving distal ends of said at least one bundle of optical fibers and aligning said distal ends with said second detector for coupling light from the optical fibers to said detector.

12. The system of claim 1, wherein said UV radiation source comprises a UV lamp.

13. The system of claim 12, wherein said UV lamp generates UV radiation with wavelengths in a range of about 185 nm to about 400 nm.

14. The system of claim 1, wherein said UV radiation source comprises a plurality of filters selectively deployable for selecting different wavelength bands of the UV light emitted by said UV lamp.

15. The system of claim 1, further comprising at least one filter disposed in front of said second detector for filtering out fluorescent excitation light generated by said laser or UV source.

16. The system of claim 1, wherein said laser light source generates light having wavelengths in a range of about 372 nm to about 980 nm.

17. The system of claim 1, wherein said first detector comprises a photodiode.

18. The system of claim 1, wherein said second detector comprises any of a photomultiplier and a diode array spectrometer.

19. The system of claim 1, wherein the plurality of capillaries are disposed within a removable cartridge that is slidably insertable into the system and wherein when the removable cartridge is in an inserted state of the system, the plurality of capillaries are aligned to receive said UV radiation and said laser light from the galvanometric mirror.

* * * * *